United States Patent
Bowden et al.

(10) Patent No.: US 9,525,952 B2
(45) Date of Patent: Dec. 20, 2016

(54) REAL-TIME AUDIENCE ATTENTION MEASUREMENT AND DASHBOARD DISPLAY

(71) Applicant: International Business Machines Corporation, Armonk, NY (US)

(72) Inventors: Scott G. Bowden, Atlanta, GA (US); Christopher J. Dawson, Arlington, VA (US); Sanjeev Kumar V. Marimekala, Naugatuck, CT (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 13/913,827

(22) Filed: Jun. 10, 2013

(65) Prior Publication Data

US 2014/0363000 A1 Dec. 11, 2014

(51) Int. Cl.
*G06F 17/00* (2006.01)
*H04R 27/00* (2006.01)

(52) U.S. Cl.
CPC ......... *H04R 27/00* (2013.01); *H04R 2227/003* (2013.01)

(58) Field of Classification Search
CPC .................. H04N 21/44218; H04N 21/44222; H04N 7/14; H04N 21/24; H04N 21/42201; H04N 21/4223; H04N 21/44213; H04N 21/4532; H04N 21/4667; H04R 27/00; H04R 2270/003; H04H 60/33; H04H 60/45; H04H 2201/90; H04L 12/1822
USPC ............... 700/94; 709/204; 348/14.01–14.08
See application file for complete search history.

(56) References Cited

U.S. PATENT DOCUMENTS

| | | | |
|---|---|---|---|
| 7,507,091 B1 | 3/2009 | Aleali | |
| 2002/0073417 A1 | 6/2002 | Kondo et al. | |
| 2007/0271518 A1 | 11/2007 | Tischer et al. | |
| 2008/0320082 A1* | 12/2008 | Kuhlke | H04L 12/1822 709/205 |
| 2012/0290950 A1* | 11/2012 | Rapaport | H04L 51/32 715/753 |
| 2013/0205311 A1* | 8/2013 | Ramaswamy | H04N 21/44213 725/9 |
| 2015/0112796 A1* | 4/2015 | Greenzeiger | G06Q 30/0251 705/14.49 |

FOREIGN PATENT DOCUMENTS

WO 2006099612 A2 9/2006

* cited by examiner

*Primary Examiner* — Fan Tsang
*Assistant Examiner* — Eugene Zhao
(74) *Attorney, Agent, or Firm* — Daniel R. Simek

(57) ABSTRACT

Embodiments of the present invention disclose a method, computer program product, and system for real-time determination of attentiveness of an audience in a room to a speaker. A computer determines amounts of wireless activity of a computing device within the room of the audience over time during the presentation. Based in part on the amounts of wireless activity of the computing device, the computer determines and initiates display of measures of attentiveness of the audience over the time during the presentation, to display changes in the measures of attentiveness of the audience to the speaker during the presentation. In another embodiment, the computer determines amounts of attentiveness of the audience within the room over time during the presentation utilizing sensors located throughout the room.

14 Claims, 6 Drawing Sheets

REAL-TIME AUDIENCE ATTENTION MEASUREMENT AND DASHBOARD DISPLAY

FIELD OF THE INVENTION

The present invention relates generally to the field of audience attention measurement, and more specifically to real-time determination of audience attention to a speaker.

BACKGROUND OF THE INVENTION

When giving a presentation to an audience, a speaker can observe the audience to some degree, but experience difficulty assessing how the audience is reacting to the speaker's presentation style, and presentation materials. The audience can be engaging in side conversations, utilizing mobile devices to access the internet, leaving the room during the presentation, or looking away from the speaker or not paying attention to the speaker. During presentations to large audiences, the speaker will have more difficulty assessing the degree to which the audience is paying adequate attention.

It was known to automatically measure the response of an audience to provided entertainment by US Pub. No.: US 2002/0073417 A1 by Kondo et al., teaching detection of an overall state of an audience, detection of individual states of members of an audience, and determining an audience response on the basis of the detected information. A playback output control system first determines the response of an audience in a hall to the object of entertainment such as a movie, and then controls the playback of the movie and the like based on the thus determined audience response. An audience response determination apparatus or in the playback output control system can utilize images of the audience, sounds generated by the audience, loads applied to each of the seats by each member of the audience, and a stepping force provided by each member of the audience to detect the overall state of the audience. A playback output control method comprises the steps of detecting an overall state of an audience, detecting individual states of the members of the audience, determining an audience response on the basis of information detected by the steps of detecting the overall state of the audience and detecting the individual states of the members of the audience, and controlling the playback operation of data to be watched or listened to by the audience on the base of the audience response determined in the determination step.

SUMMARY

Embodiments of the present invention disclose a method, computer program product, and system for real-time determination of attentiveness of an audience in a room to a speaker. A computer determines amounts of wireless activity of a computing device within the room of the audience over time during the presentation. Based in part on the amounts of wireless activity of the computing device, the computer determines and initiates display of measures of attentiveness of the audience over the time during the presentation, to display changes in the measures of attentiveness of the audience to the speaker during the presentation. In another embodiment, the computer determines amounts of attentiveness of the audience within the room over time during the presentation utilizing sensors located throughout the room.

DETAILED DESCRIPTION

Figure 1:
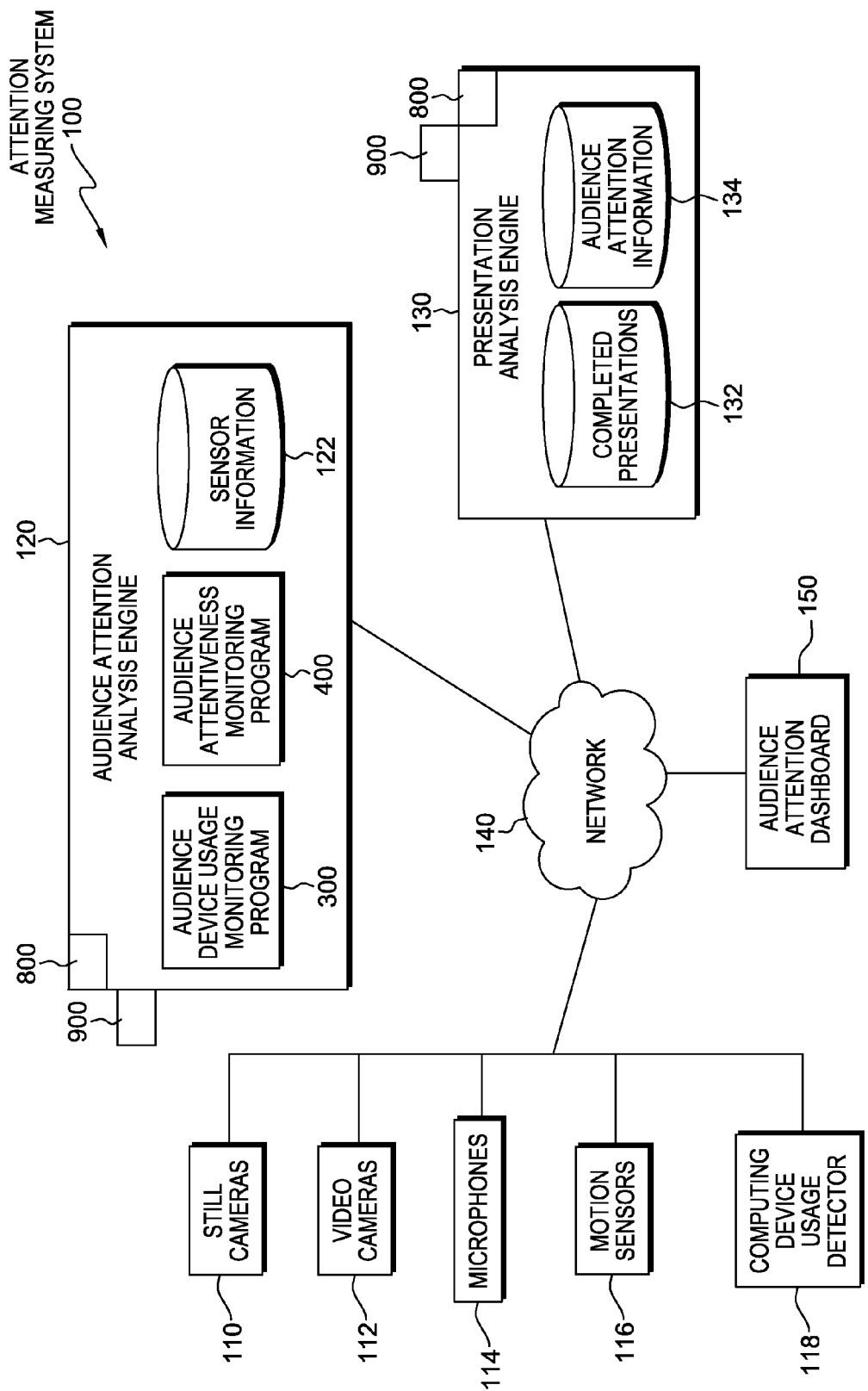
FIG. 1 is a functional block diagram of an attention measuring system in accordance with an embodiment of the present invention.

The present invention will now be described in detail with reference to the Figures. FIG. 1 is a functional block diagram illustrating attention measuring system 100, in accordance with one embodiment of the present invention.

Attention measuring System 100 includes still cameras 110, video cameras 112, microphones 114, motion sensors 116, computing device usage detector 118, audience attention analysis engine 120, presentation analysis engine 130, network 140, and audience attention dashboard 150. Still cameras 110, video cameras 112, microphones 114, motion sensors 116, and computing device usage detector 118 are sensors operating within a room in which a presentation is being made, and gathering information corresponding to attention of individuals in the room. Still cameras 110, video cameras 112, microphones 114, motion sensors 116, and computing device usage detector 118 send information to audience attention analysis engine 120. For example, still cameras 110, video cameras 112, microphones 114, motion sensors 116, and computing device usage detector 118 are positioned in a room where a presentation is being given. Still cameras 110, video cameras 112, microphones 114, motion sensors 116, and computing device usage detector 118 are sensors that can gather information corresponding to an audience of a presentation in a unobtrusive manner (i.e. without affecting the experience of the audience).

Still cameras 110 are devices capable of capturing images (i.e. digital cameras) and sending the images to audience attention analysis engine 120. For example, still cameras 110 take pictures of a room at predetermined time intervals during a presentation or upon occurrences of predetermined events such as a slide transition in a presentation or other events during a presentation, and send the pictures to audience attention analysis engine 120. Video cameras 112 are devices capable of capturing videos (i.e. digital video cameras) and sending the videos to audience attention analysis engine 120. For example, video cameras 112 take continuous video of a room throughout a presentation and send the video to audience attention analysis engine 120. Microphones 114 are devices capable of capturing and recording sound in various parts of a room (i.e. directional microphones), and sending the sound recordings to audience attention analysis engine 120. For example, microphones 114 are placed throughout a room (i.e. on the backs of seats) where a presentation is occurring, continuously record sounds in the room (i.e. background noise, conversations between audience members), and send the sound recording to audience attention analysis engine 120. Microphones 114 can be positioned throughout the room and on seats in the room to detect and locate sounds in the room (i.e. conversations between audience members). Motion sensors 116 are devices capable of monitoring and recording movements of individuals in a room (i.e. getting up out of a chair, movement while sitting in a chair), and send the recorded movements to audience attention analysis engine 120. Motion sensors can include load sensors with capabilities for detecting movement (i.e. fidgeting) of an audience member within a seat. For example, motion sensors 116 are placed in chairs of audience members of a presentation, and send indications of movement in the audience members chairs to audience attention analysis engine 120. Utilizing data from still cameras 110, video cameras 112, microphones 114, and motion sensors 116 to determine attentiveness of an audience as discussed in greater detail with regards to FIG. 4.

Computing device usage detector 118 monitors network communications in and out of computing devices within an area. For example, computing device usage detector 118 monitors computing devices accessing the internet through methods including WiFi®, mobile phone communications, and wired network connections. Computing device usage detector 118 is associated with a wireless network of a presentation room, and can monitor data (i.e. radio frequency signals, mobile phone communications, and other network communications) sent and received by computing devices in the presentation room. Computing device usage detector 118 also determines increases in network communications on computing devices (i.e. an increase in internet traffic) by detecting an increase in data sent or received by computing devices in the presentation room and the amount of the increase, and sends an indication of the increase in network communications to audience attention analysis engine 120. Utilizing data from computing device usage detector 118 to determine device usage for an audience is discussed in greater detail with regards to FIG. 3.

Audience attention analysis engine 120 gathers information corresponding to an audience from still cameras 110, video cameras 112, microphones 114, motion sensors 116, and computing device usage detector 118 and utilizes the information to determine attentiveness and device usage of the audience. Audience attention analysis engine 120 can be a computer program executing on desktop computers, specialized computer servers, or any other computer systems known in the art. In certain embodiments, audience attention analysis engine 120 represents a computer system with programming utilizing clustered computers and components (e.g., database server computers, application server computers, etc.) that act as a single pool of seamless resources when accessed by elements of attention measuring system 100. In general, audience attention analysis engine 120 is representative of any programmed electronic device or combination of programmed electronic devices, as described in greater detail with regards to FIG. 6.

Audience attention analysis engine 120 includes audience device usage monitoring program 300, audience attentiveness monitoring program 400, and sensor information 122. Sensor information 122 can be stored on any type of storage device that is capable of storing data that may be accessed and utilized by audience attention analysis engine 120, such as a database server, a hard disk drive, or flash memory. Sensor information 122 includes information that audience attention analysis engine 120 gathers from still cameras 110, video cameras 112, microphones 114, motion sensors 116, and computing device usage detector 118. Audience device usage monitoring program 300 utilizes information stored in sensor information 122 corresponding to computing device usage detector 118 to determine device usage for an audience. Audience device usage monitoring program 300 is discussed in greater detail with regards to FIG. 3. Audience attentiveness monitoring program 400 determines attentiveness of an audience utilizing information stored in sensor information 122 corresponding to still cameras 110, video cameras 112, microphones 114, and motion sensors 116. Audience attentiveness monitoring program 400 is discussed in greater detail with regards to FIG. 4.

Presentation analysis engine 130 includes completed presentations 132 and audience attention information 134. In one embodiment, presentation analysis engine 130 can be a computer program executing on desktop computers, specialized computer servers, or any other computer systems known in the art. In certain embodiments, presentation analysis engine 130 represents a computer system utilizing clustered computers and components (e.g., database server computers, application server computers, etc.) that act as a single pool of seamless resources when accessed by elements of attention measuring system 100. In general, presentation analysis engine 130 is representative of any programmed electronic device or combination of programmed electronic devices capable of executing machine-readable program instructions, as described in greater detail with regards to FIG. 6. Presentation analysis engine 130 allows an individual to view a completed presentation, and associated audience attention information throughout the presentation. Audience attention reflects how closely an audience is playing attention to an individual presenting (i.e. computing device usage, attentiveness). For example, an individual can see which portions of a presentation correspond to increased computing device usage for the audience members based on real-time reporting of collective usage of the computing devices.

In one embodiment, completed presentations 132 stores completed presentations analyzed by audience attention analysis engine 120. In another embodiment, audience attention information 134 stores information corresponding to audience attention information gathered and analyzed by audience attention analysis engine 120 that corresponds to a presentation in completed presentations 132. For example, an individual utilizes audience device usage monitoring program 300 while giving a presentation. In this example, upon completion of the presentation, completed presentations 132 stores the presentation, and audience attention information 134 stores audience attention information timed with the presentation. Completed presentations 132 and audience attention information 134 can be stored on any type of storage device that is capable of storing data that may be accessed and utilized by presentation analysis engine 130, such as a database server, a hard disk drive, or flash memory. In other embodiments, completed presentations 132 and audience attention information 134 can be stored on multiple storage devices within presentation analysis engine 120.

In one embodiment, elements of attention measuring system 100 communicate through network 140. Network 140 can be, for example, a local area network (LAN), a telecommunications network, a wide area network (WAN) such as the Internet, or a combination of the three, and include wired, wireless, or fiber optic connections. In general, network 140 can be any combination of connections and protocols that will support communications between still cameras 110, video cameras 112, microphones 114, motion sensors 116, computing device usage detector 118, audience attention analysis engine 120, presentation analysis engine 130, network 140, and audience attention dashboard 150 in accordance with exemplary embodiments of the present invention.

In exemplary embodiments, audience attention dashboard 150 provides a mechanism to display data to a user and may be, for example, a computer monitor. Audience attention dashboard 150 can also function as a touch screen, such as a display of a tablet computer. For example, audience attention dashboard 150 receives audience attention information (i.e. audience device usage, audience attentiveness) from audience attention analysis engine 120. In this example, audience attention dashboard 150 displays the audience attention information to an individual presenting to the audience. Sample audience attention dashboard 500 is an exemplary depiction of audience attention dashboard 150 displaying audience attention information.

Figure 2:
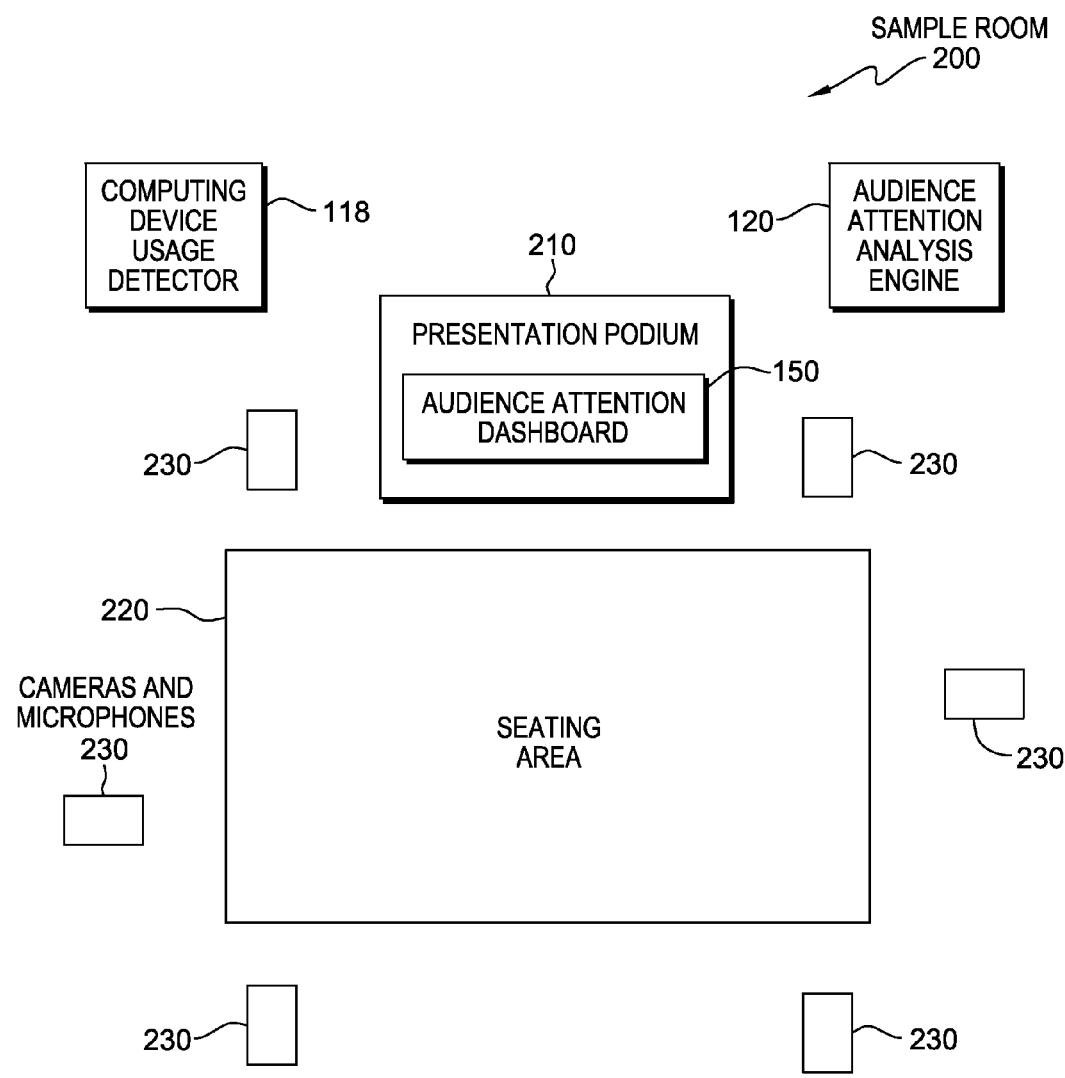
FIG. 2 is a schematic of a sample room including elements of the attention measuring system of FIG. 1 in accordance with an embodiment of the present invention.

FIG. 2 illustrates a sample room 200 in which a presentation is given. The room is equipped with computing device usage detector 118, audience attention analysis engine 120, presentation podium 210, audience attention dashboard 150, seating area 220, and cameras and microphones 230. Computing device usage detector 118 and audience attention analysis engine 120 are previously discussed with regards to FIG. 1. In exemplary embodiments, audience attention analysis engine 120 includes audience device usage monitoring program 300 and audience attentiveness monitoring program 400.

In one embodiment, presentation podium 210 includes audience attention dashboard 150. Presentation podium 210 can be any stand or platform that an individual can utilize to give a presentation. Presentation podium 210 can include audience attention dashboard 150 so that an individual utilizing presentation podium 210 to give a presentation can view audience attention dashboard 150 while giving the presentation. Audience attention dashboard 150 can be a mobile device, allowing removal of audience attention dashboard 150 from presentation podium 210. Audience attention dashboard 150 is previously discussed in greater detail with regards to FIG. 1. In exemplary embodiments, seating area 220 is an area where an audience of the presentation can sit to view the presentation. Seats in seating area 220 include motion sensors 116 (previously discussed with regards to FIG. 1). In one embodiment, cameras and microphones 230 include still cameras 110, video cameras 12, and microphones 114 (previously discussed with regards to FIG. 1). Cameras and microphones 230 are positions throughout sample room 200 to collect data corresponding to attentiveness to the presentation of audience members in seating area 220.

Figure 3:
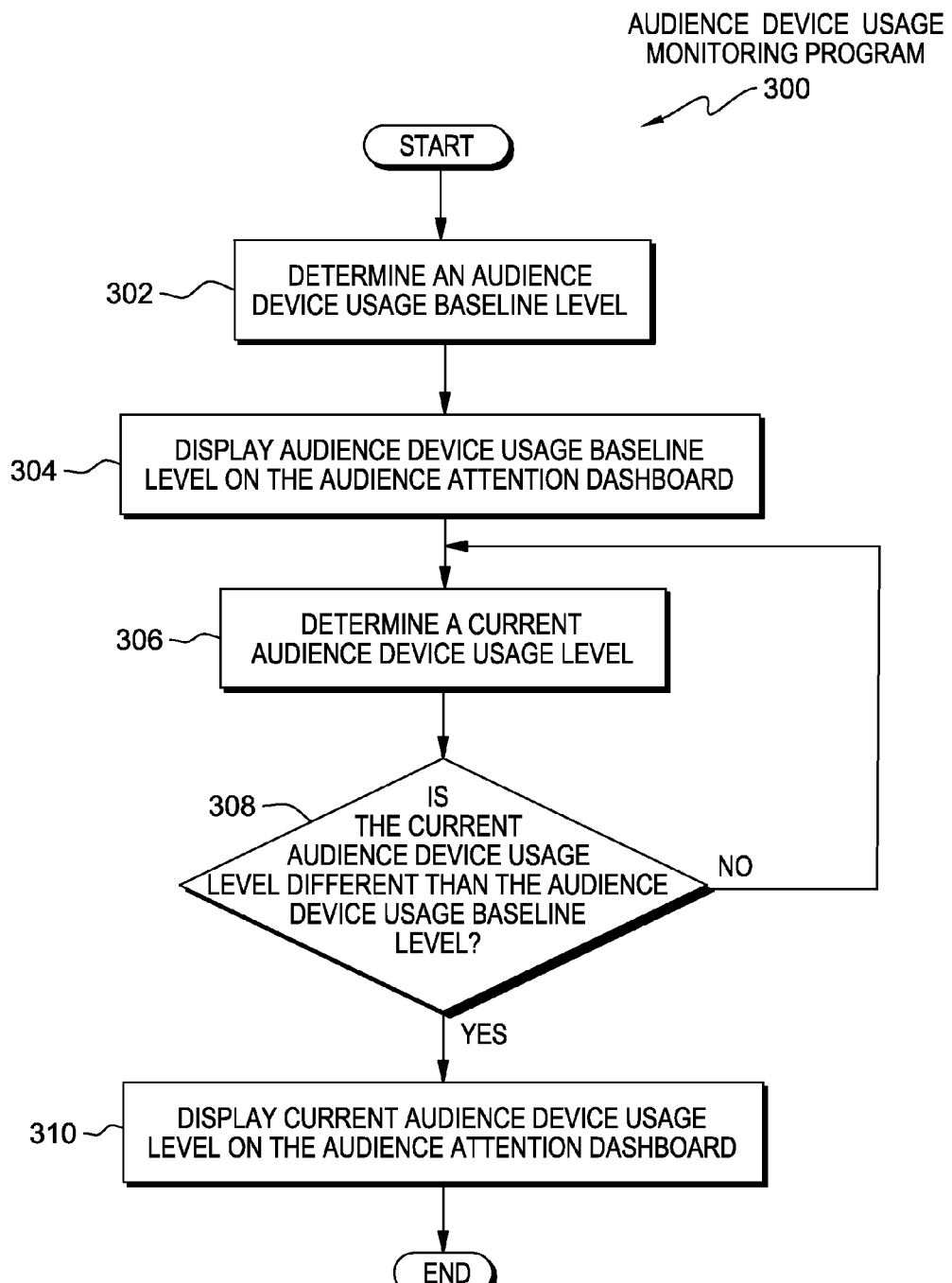
FIG. 3 is a flowchart of operational steps of an audience device usage monitoring program of FIG. 1 for monitoring computing device usage for audience members, in accordance with an embodiment of the present invention.

FIG. 3 is a flowchart depicting operational steps of audience device usage monitoring program 300 in accordance with an exemplary embodiment of the present invention. In one embodiment, audience device usage monitoring program 300 initiates at the beginning of a presentation. In other embodiments, a presentation can be a representation of one or more individuals communicating with an audience (i.e. presentation in a meeting, performance to an audience). FIG. 2 is an exemplary depiction of sample room 200, which audience device usage monitoring program 300 operates in accordance with an exemplary embodiment of the invention. The audience device usage determined by audience device usage monitoring program 300 throughout a presentation is stored in audience attention information 134 and associated with the presentation that is stored in completed presentations 132, allowing the presenter to review device usage of the audience correlated to a time in the presentation.

In step 302, audience device usage monitoring program 300 determines an audience device usage baseline level. In one embodiment, audience device usage monitoring program 300 utilizes computing device usage detector 118 to determine a baseline level indicating a number of individuals in the audience of the presentation using computing devices. In an example with regards to sample room 200, at the beginning of a presentation audience device usage monitoring program 300 utilizes computing device usage detector 118 to determine individuals in seating area 220 that are utilizing a computing device to access the internet (i.e. wireless activity of a computing device). In this example, audience device usage monitoring program 300 determines the number of individuals in seating area 220 that are utilizing a computing device to be the audience device usage baseline level by utilizing computing device usage detector 118 to identify computing devices in seating area 220 that are sending and receiving data. In another embodiment, audience device usage monitoring program 300 utilizes computing device usage detector 118 to determine a location of individuals utilizing a computing device to access the internet by identifying computing devices in seating area 220 that are sending and receiving data, and including the determined location in the audience device usage baseline level. The location of devices can be determined to be a certain section of seating area 220, or at a specific location within seating area. In exemplary embodiments, audience device usage monitoring program 300 stores the determined audience device usage baseline level and associated information from computing device usage detector 118 in sensor information 122. In another embodiment, the baseline level is determined as an average of audience device usage over a period of time at the beginning of the presentation. In an example, a presenter can indicate the period of time for the determination of the baseline level (i.e. first few minutes of the presentation, a time period excluding the first minute of the presentation, starting corresponding with a certain slide of the presentation).

In step 304, audience device usage monitoring program 300 displays the audience device usage baseline level on the audience attention dashboard. In one embodiment, audience device usage monitoring program 300 sends the determined audience device usage baseline level to audience attention dashboard 150 through network 140. In an example with regards to sample room 200, audience device usage monitoring program 300 displays the audience device usage baseline level on audience attention dashboard 150, wherein the audience device usage baseline level appears on audience attention dashboard 150 as a color-coded graphical representation of device usage in seating area 220. A color-coded graphical representation utilizes red/yellow/green indications to depict audience device usage in seating area 220 (i.e. red indicating a high amount of device usage, yellow indicating an increased amount of device usage, and green indicating device usage close to the baseline level). Audience device usage monitoring program 300 displays the audience device usage baseline level on audience attention dashboard 150 as a green graphical representation, indicating that the audience device usage baseline level is normal for the environment of the presentation.

In step 306, audience device usage monitoring program 300 determines a current audience device usage level. In one embodiment, audience device usage monitoring program 300 utilizes computing device usage detector 118 to determine a current audience device usage level indicating a number of individuals in the audience of the presentation using computing devices. In an example with regards to sample room 200, audience device usage monitoring program 300 utilizes usage detector 118 to determine individuals in seating area 220 that are utilizing a computing device to access the internet. In this example, audience device usage monitoring program 300 determines the number of individuals in seating area 220 that are utilizing the computing device to be the current audience device usage level. In another embodiment, audience device usage monitoring program 300 utilizes computing device usage detector 118 to determine a location of individuals utilizing a computing device to access the internet, and includes the determined location in the current audience device usage level. In exemplary embodiments, audience device usage monitoring program 300 stores the determined current audience device usage level and associated information from computing device usage detector 118 in sensor information 122. Audience device usage monitoring program 300 can determine a current audience device usage level continuously throughout a presentation. For example, since the start of a presentation multiple individuals in the audience have begun to utilize computing devices to access the internet (i.e. browse websites, check e-mail etc.). In this example, audience device usage monitoring program 300 identifies these individuals and includes the individuals in the determined current audience device usage level.

In decision step 308, audience device usage monitoring program 300 determines whether the current audience device usage level is different than the audience device usage baseline level. In one embodiment, audience device usage monitoring program 300 compares the current audience device usage level (from step 306) to the audience device usage baseline level (from step 302) that are stored in sensor information 122. In exemplary embodiments, audience device usage monitoring program 300 compares the number of individuals utilizing computing devices in the current audience device usage baseline level and the audience device usage baseline level. In another embodiment, audience device usage monitoring program 300 compares the location in the room of individuals utilizing computing devices in the current audience device usage baseline level and the audience device usage baseline level. If audience device usage monitoring program 300 determines than the current audience device usage level is not different that the audience device usage baseline level, audience device usage monitoring program 300 repeats step 306. In a first example with regards to sample room 200, audience device usage monitoring program 300 determines an increased number of individuals utilizing computing devices to access the internet in seating area 220 and the locations within seating area 220 of the individuals utilizing computing devices to access the internet.

In step 310, audience device usage monitoring program 300 displays current audience device usage level on the audience attention dashboard. In one embodiment, if audience device usage monitoring program 300 determines that the current audience device usage level (step 306) is different than the audience device usage baseline level (step 302), audience device usage monitoring program 300 sends data related to the determined current audience device usage level through network 140 for display on audience attention dashboard 150. In an example with regards to sample room 200, audience device usage monitoring program 300 displays the current audience device usage level on audience attention dashboard 150 in the form of a color-coded graphical representation (discussed with regards to step 304).

Figure 5:
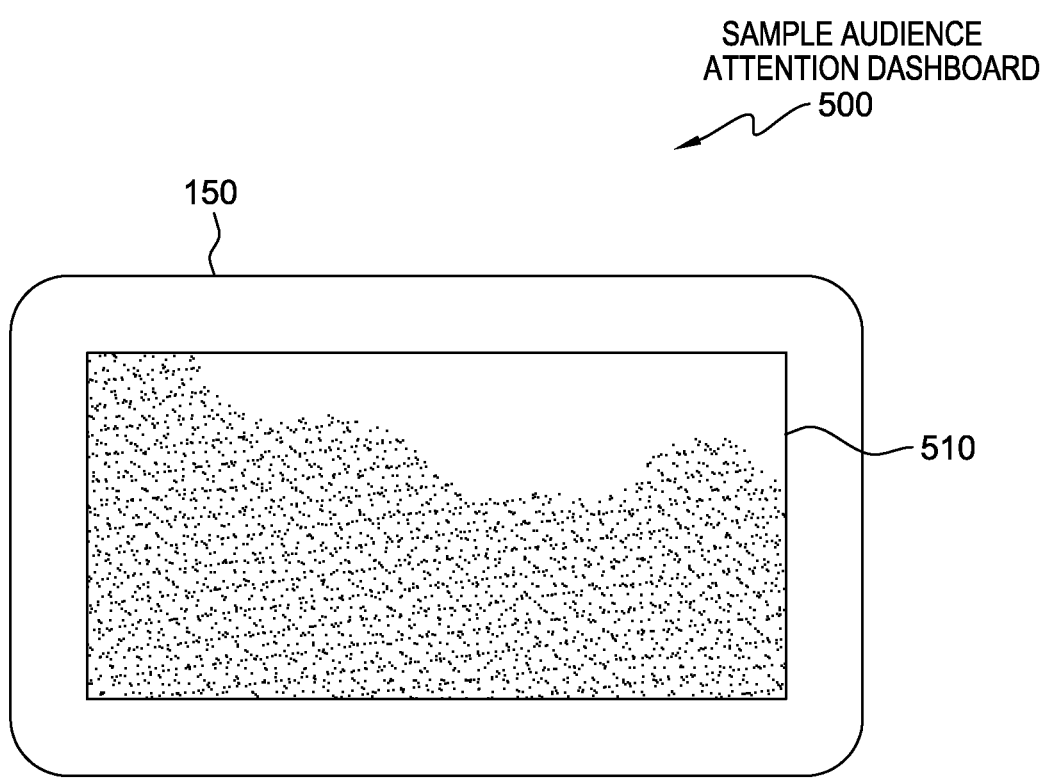
FIG. 5 is an exemplary depiction of an audience attention dashboard generated by an audience device usage monitoring program and an audience attentiveness monitoring program of FIG. 1 which depicts a color-coded graphical representation of audience device usage and audience attentiveness, in accordance with an embodiment of the present invention.

In another embodiment, audience device usage monitoring program 300 utilizes pre-defined threshold values indicating amounts of device usage that correspond to red/yellow/green on the color-coded graphical representation display of audience attention dashboard 150. In the first example (previously discussed in decision step 308), audience device usage monitoring program 300 displays an updated color-coded graphical representation on audience attention dashboard 150 depicting the increased number of individuals utilizing computing devices to access the internet in seating area 220, and the corresponding locations of the individuals. In this example, FIG. 5 depicts sample audience attention dashboard 500 displaying the current audience device usage level, wherein display 510 indicates a shaded in area representing a green portion of the color-coded graphical representation (i.e. similar to the audience device usage baseline level), and a non-shaded in area representing a yellow portion of the color-coded graphical representation. The yellow portion of the color-coded graphical representation in display 510 indicates a section of seating area 220 where an increased number of individuals are utilizing computing devices to access the internet compared to the audience device usage baseline level. In another embodiment, audience device usage monitoring program 300 includes a pre-defined threshold value indicating that if a specified number of individuals in the audience are utilizing computing devices to access the internet, the one or more individual presenting has lost the audience. With regards to the first example, if the number of individuals utilizing computing devices to access the internet is greater than the pre-defined threshold value, audience device usage monitoring program 300 displays the current device usage level on audience attention dashboard 150 along with an indication that the audience is lost (i.e. text in the color-coded graphical representation, a lost light indicator). In exemplary embodiments, audience device usage monitoring program 300 repeats throughout the presentation, providing real-time feedback of audience device usage.

Figure 4:
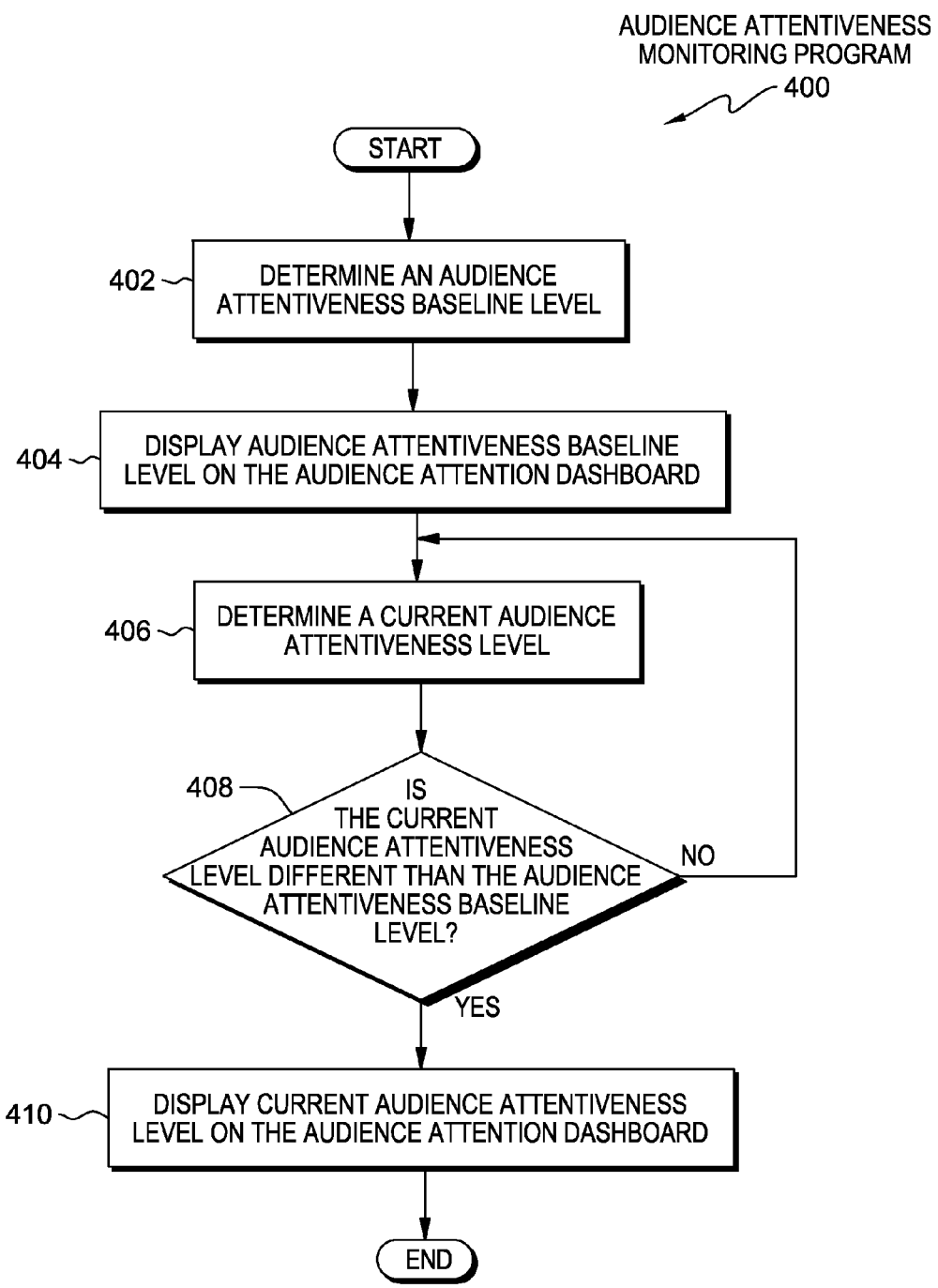
FIG. 4 is a flowchart of operational steps of an audience attentiveness monitoring program of FIG. 1 for monitoring attentiveness of audience members, in accordance with an embodiment of the present invention.

FIG. 4 is a flowchart depicting operational steps of audience attentiveness monitoring program 400 in accordance with an exemplary embodiment of the present invention. In one embodiment, audience attentiveness monitoring program 400 initiates at the beginning of a presentation. In other embodiments, a presentation can be a representation of one or more individuals communicating with an audience (i.e. presentation in a meeting, performance to an audience). FIG. 2 is an exemplary depiction of sample room 200, which audience device usage monitoring program 300 operates in accordance with an exemplary embodiment of the invention. The audience attentiveness determined by audience attentiveness monitoring program 400 throughout a presentation is stored in audience attention information 134 and associated with the presentation that is stored in completed presentations 132, allowing the presenter to review attentiveness of the audience correlated to a time in the presentation.

In step 402, audience attentiveness monitoring program 400 determines an audience attentiveness baseline level. In one embodiment, audience attentiveness monitoring program 400 utilizes information from still cameras 110, video cameras 112, microphones 114 and motion sensors 116 to determine a baseline level indicating attentiveness of the audience of the presentation. In an example with regards to sample room 200, at the beginning of a presentation audience attentiveness monitoring program 400 utilizes information from cameras and microphones 230 (which includes still cameras 110, video cameras 112, and microphones 114), and motion sensors 116 in seating area 220 to determine attentiveness of individuals in seating area 220. In exemplary embodiments, a baseline level can be determined for each sensor (i.e. a baseline value for microphones 114, a baseline value for motion sensors 116, a baseline value for still cameras 110, and a baseline value for video cameras 112).

In exemplary embodiments, audience attentiveness monitoring program 400 utilizes information from still cameras 110 and video cameras 112 placed throughout the room (i.e. cameras and microphones 230 in sample room 200) to determine baseline images, video and sounds of the audience that audience attentiveness monitoring program 400 can utilize for comparisons throughout the presentation. In an example, audience attentiveness monitoring program 400 utilizes pictures and video from still cameras 110 and video cameras 112 to identify movement of individuals in the audience, individuals looking at the presenter and locations of the identified individuals in seating area 220. Audience attentiveness monitoring program 400 can utilize eye detection to determine whether individuals in seating area 220 are looking at the presenter. Eye detection of audience members can be accomplished utilizing eye and facial recognition capabilities of cameras. In one example, still cameras 110 and video cameras 112 can identify reflection of light out of the retina to determine that an audience member is looking at the presenter. For example, audience attentiveness monitoring program 400 determines identified information from still cameras 110 and video cameras 112 (i.e. audience movement, audience looking at presenter, and locations) to determine the audience attentiveness baseline level corresponding to still cameras 110 and video cameras 112. In an example, audience attentiveness monitoring program 400 utilizes sound from microphones 114 to identify side conversations occurring between individuals in seating area 220, and locations of the identified side conversations. Audience attentiveness monitoring program 400 can utilize microphones 116 that are places on seats in seating area 220 to determine locations where side conversations are occurring. For example, audience attentiveness monitoring program 400 determines identified information from microphones 114 (i.e. side conversations in audience, location of side conversations, and volume of side conversations) to determine the audience attentiveness baseline corresponding to microphones 114. To determine a baseline level for microphones 114, audience attentiveness monitoring program 400 can identify a decibel level corresponding to microphones 114 (i.e. a decibel level associated with each microphone, a decibel level associated with a grouped section of microphones in an area).

In exemplary embodiments, audience attentiveness monitoring program 400 utilizes information from motion sensors 116 located in seating area 220 of sample room 200 to determine baseline movements and locations within seating area 220 of the audience that audience attentiveness monitoring program 400 can utilize for comparisons throughout the presentation. In an example, audience attentiveness monitoring program 400 utilizes movement information from motion sensors 116 to identify movement of individuals in seating area 220 (i.e. individuals fidgeting within seats), and where individuals are sitting (i.e. occupied seats in seating area 220) in seating area 220. Audience attentiveness monitoring program 400 can utilize load sensing capabilities of motion sensors 116 located in each seat to identify which seats are occupied, and the amount of movement of individuals in occupied seats. For example, audience attentiveness monitoring program 400 determines identified information from motion sensors 116 (i.e. occupied seats, and movement within occupied seats) to determine the audience attentiveness baseline level corresponding to motion sensors 116. To determine a baseline level for motion sensors 116 audience attentiveness monitoring program 400 can detect movement (i.e. fidgeting) within seats, and a time associated with the movement (i.e. frequency of movement, or a duration of movement) utilizing load sensing capabilities of motion sensors 116. In exemplary embodiments, audience attentiveness monitoring program 400 stores the determined information corresponding to the audience attentiveness baseline level associated with still cameras 110, video cameras 112, microphones 114, and motion sensors 116 in sensor information 122. In another embodiment, the baseline level is determined as an average of audience attentiveness over a period of time at the beginning of the presentation. In an example, a presenter can indicate the period of time for the determination of the baseline level (i.e. first few minutes of the presentation, a time period excluding the first minute of the presentation, starting corresponding with a certain slide of the presentation).

In step 404, audience attentiveness monitoring program 400 displays audience attentiveness baseline level on the audience attention dashboard. In one embodiment, audience attentiveness monitoring program 400 sends the determined audience attentiveness baseline level to audience attention dashboard 150 through network 140. In an example with regards to sample room 200, audience attentiveness monitoring program 400 displays the audience attentiveness baseline level on audience attention dashboard 150, wherein the audience attentiveness baseline level appears on audience attention dashboard 150 as a color-coded graphical representation of seating area 220 (color-coded graphical representation parameters discussed with regards to step 304 of audience device usage monitoring program 300). Audience attentiveness monitoring program 400 displays the audience attentiveness baseline level on audience attention dashboard 150 as a green graphical representation, indicating that the audience attentiveness baseline level is normal for the environment of the presentation.

In step 406, audience attentiveness monitoring program 400 determines a current audience attentiveness level. In one embodiment, audience attentiveness monitoring program 400 utilizes still cameras 110, video cameras 112, microphones 114, and motion sensors 116 to determine a current audience attentiveness level for the audience of the presentation. In an example with regards to sample room 200, audience attentiveness monitoring program 400 utilizes information from cameras and microphones 230 (which includes still cameras 110, video cameras 112, and microphones 114), and motion sensors 116 in seating area 220 to determine attentiveness of individuals in seating area 220. Exemplary methods for utilizing still cameras 110, video cameras 112, microphones 114, and motion sensors 116 to determine attentiveness of individuals in an audience (i.e. seating area 220) are discussed with regards to step 402. In exemplary embodiments, audience attentiveness monitoring program 400 stores the determined current attentiveness level and associated information from still cameras 110, video cameras 112, microphones 114, motion sensors 116 in sensor information 122. Audience attentiveness monitoring program 400 can determine a current audience attentiveness level continuously throughout a presentation. For example, since the start of a presentation multiple individuals in the audience have exhibited indications of decreased attentiveness (i.e. not looking up at the individual presenting, engaging in side conversations, and fidgeting within seats). In this example, audience attentiveness monitoring program 400 utilizes still cameras 110, video cameras 112, microphones 114, motion sensors 116 to identify and locate individuals in the audience exhibiting indications of decreased attentiveness, and includes the identified individuals in the determined current audience attentiveness level. In another embodiment, when microphones 114 detect applause, audience attentiveness monitoring program 400 does not include the applause to indicate a decrease in audience attentiveness.

In decision step 408, audience attentiveness monitoring program 400 determines whether the current audience attentiveness level is different than the audience attentiveness baseline level. In one embodiment, audience attentiveness monitoring program 400 compares the current audience attentiveness level (from step 406) to the audience attentiveness baseline level (from step 402) that are stored in sensor information 122. In exemplary embodiments, audience attentiveness monitoring program 400 compares information associated with still cameras 110, video cameras 112, microphones 114, motion sensors 116 in the current audience attentiveness level with the audience attentiveness baseline level.

For example, audience attentiveness monitoring program 400 utilizes pictures and video from still cameras 110 and video cameras 112 to determine whether a difference exists between the current audience attentiveness level and the audience attentiveness baseline level. In this example, audience attentiveness monitoring program 400 can identify whether differences exist in movement of individuals in the audience, individuals looking up at the presenter (eye detection), and locations of the identified individuals in seating area 220. In another example, audience attentiveness monitoring program 400 utilizes sound from microphones 114 to determine whether a difference exists between the current audience attentiveness level and the audience attentiveness baseline level. In this example, audience attentiveness monitoring program 400 can identify whether differences exist in side conversations occurring between individuals in seating area 220 (number of conversations and volume of conversations), and locations of the identified side conversations. In another example, audience attentiveness monitoring program 400 utilizes movement and location information from motion sensors 116 to determine whether a difference exists between the current audience attentiveness level and the audience attentiveness baseline level. In this example, audience attentiveness monitoring program 400 can identify whether differences exist in movement of individuals in seating area 220 (i.e. individuals fidgeting within seats), and where individuals are sitting (i.e. occupied seats in seating area 220) in seating area 220. If audience attentiveness monitoring program 400 determines that the current audience attentiveness level is not different than the audience attentiveness baseline level, audience attentiveness monitoring program 400 repeats step 406. In a first example with regards to sample room 200, audience attentiveness monitoring program 400 determines individuals in the audience have left seats in a section of seating area 220 (through utilization of motion sensors 116), side conversations are occurring at an increased frequency in a section of seating area 220 (through utilization of microphones 114), and individuals in a section of seating area 220 are not looking at the individual presenting (through utilization of still cameras 110 and video cameras 112).

In step 410, audience attentiveness monitoring program 400 displays current audience attentiveness level on the audience attention dashboard. In one embodiment, if audience attentiveness monitoring program 400 determines that the current audience attentiveness level (step 406) is different than the audience attentiveness baseline level (step 402), audience attentiveness monitoring program 400 sends the determined current audience attentiveness level through network 140 for display on audience attention dashboard 150. In an example with regards to sample room 200, audience attentiveness monitoring program 400 displays the current audience attentiveness level on audience attention dashboard 150 in the form of a color-coded graphical representation (discussed with regards to step 404). In another embodiment, audience attentiveness monitoring program 400 utilizes pre-defined threshold values indicating amounts of device usage that correspond to red/yellow/green on the color-coded graphical representation display of audience attention dashboard 150.

In the first example (previously discussed in decision step 408), audience attentiveness monitoring program 400 displays an updated color-coded graphical representation on audience attention dashboard 150 depicting individuals in the audience have left seats in a section of seating area 220, side conversations are occurring at an increased frequency in a section of seating area 220, and individuals in a section of seating area 220 are not looking at the individual presenting. In this example, FIG. 5 depicts sample audience attention dashboard 500 displaying the current audience attentiveness level, wherein display 510 indicates a shaded in area representing a green portion of the color-coded graphical representation (i.e. similar to the audience attentiveness baseline level), and a non-shaded in area representing a yellow portion of the color-coded graphical representation. The yellow portion of the color-coded graphical representation in display 510 indicates a section of seating area 220 where individuals in the audience have left seats in seating area 220, side conversations are occurring at an increased frequency in seating area 220, and individuals in seating area 220 are not looking at the individual presenting in comparison to the audience attentiveness baseline level. In another embodiment, audience attentiveness monitoring program 400 includes a pre-defined threshold value indicating that if a specified amount of individuals in the audience are exhibiting indications of decreased attentiveness (in comparison to the audience attentiveness baseline level), the one or more individuals presenting have lost the audience. With regards to the first example and sample audience attention dashboard 500, if the percentage of audience attention dashboard 150 exhibiting indications of decreased attentiveness is greater than the pre-defined value (i.e. more than 50% of display 510 is yellow/red), audience attentiveness monitoring program 400 displays the current audience attentiveness level on audience attention dashboard 150 along with an indication that the audience is lost (i.e. text in the color-coded graphical representation, a lost light indicator). In exemplary embodiments, audience attentiveness monitoring program 400 repeats throughout the presentation, providing real-time feedback of audience device usage.

FIG. 5 is an exemplary depiction of sample audience attention dashboard 500 in accordance with an exemplary embodiment of the present invention. In one embodiment, sample attention dashboard 500 is an exemplary depiction on audience attention dashboard 150 displaying a color-coded graphical representation on display 510. In exemplary embodiments, sample audience attention dashboard 500 displays information from audience device usage monitoring program 300 and audience attentiveness monitoring program 400 in accordance with exemplary embodiments of the present invention.

Figure 6:
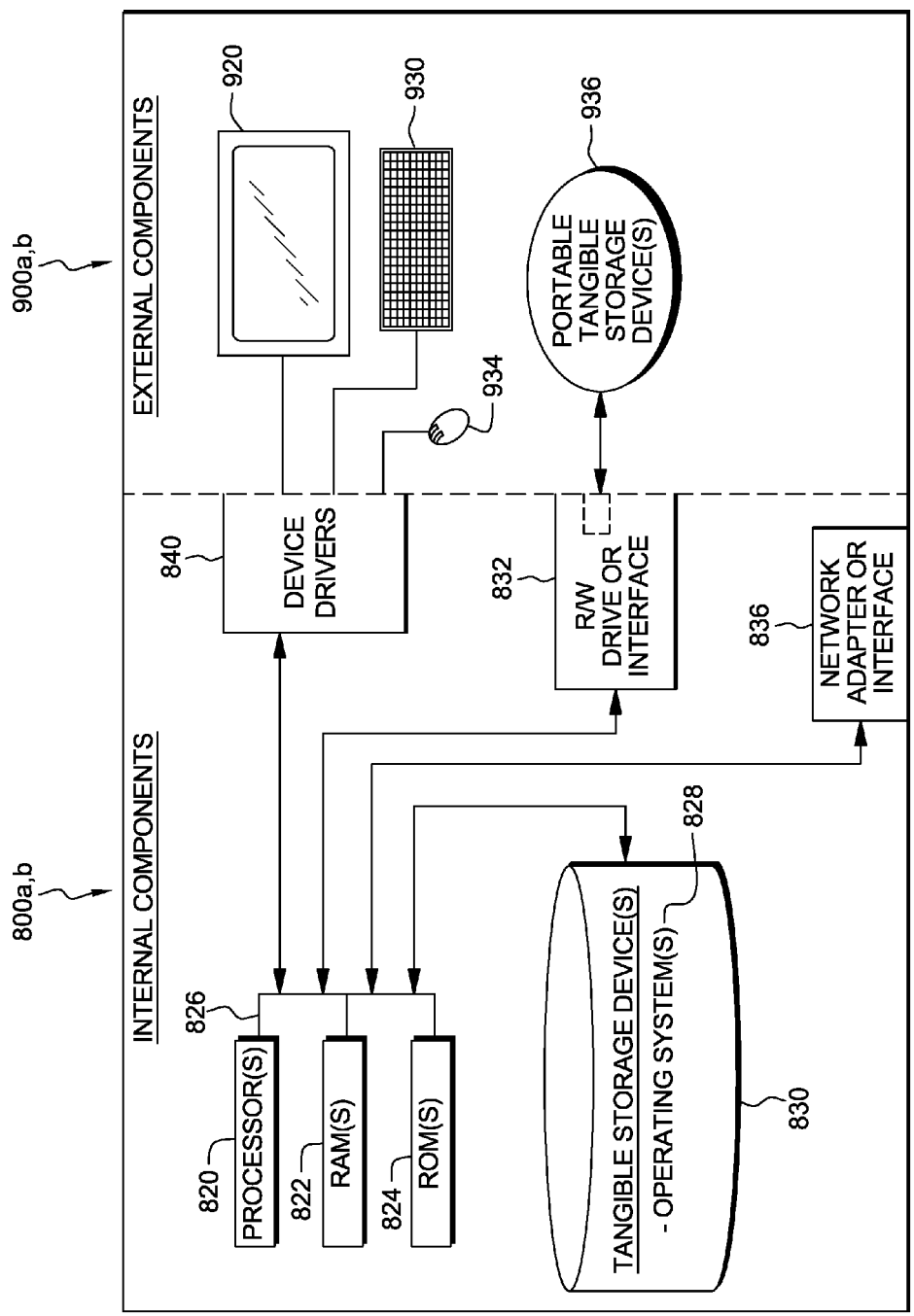
FIG. 6 is a block diagram of components of the computers of FIG. 1.

Computing/processing devices audience attention analysis engine 120 and presentation analysis engine 130 include respective sets of internal components 800a,b, and external components 900a,b, illustrated in FIG. 6. Each of the sets of internal components 800a,b includes one or more processors 820, one or more computer-readable RAMs 822 and one or more computer-readable ROMs 824 on one or more buses 826, one or more operating systems 828 and one or more computer-readable tangible storage devices 830. The one or more operating systems 828, audience device usage monitoring program 300, audience attentiveness monitoring program 400 and sensor information 122 (for audience attention analysis engine 120), completed presentations 132 and audience attention information 134 (for presentation analysis engine 130) are stored on one or more of the respective computer-readable tangible storage devices 830 for execution by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store but does not transmit a computer program and digital information.

Each set of internal components 800a,b also includes a R/W drive or interface 832 to read from and write to one or more portable computer-readable tangible storage devices 936 that can store but do not transmit a computer program, such as a CD-ROM, DVD, memory stick, magnetic tape, magnetic disk, optical disk or semiconductor storage device. Audience device usage monitoring program 300, audience attentiveness monitoring program 400 and sensor information 122 (for audience attention analysis engine 120), completed presentations 132 and audience attention information 134 (for presentation analysis engine 130) can be stored on one or more of the respective portable computer-readable tangible storage devices 936, read via the respective R/W drive or interface 832 and loaded into the respective hard drive or semiconductor storage device 830.

Each set of internal components 800a,b also includes a network adapter or interface 836 such as a TCP/IP adapter card or wireless communication adapter (such as a 4G wireless communication adapter using OFDMA technology). Audience device usage monitoring program 300, audience attentiveness monitoring program 400 and sensor information 122 (for audience attention analysis engine 120), completed presentations 132 and audience attention information 134 (for presentation analysis engine 130) can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

Each of the sets of external components 900a,b includes a display screen 920, a keyboard or keypad 930, and a computer mouse or touchpad 940. Each of the sets of internal components 800a,b also includes device drivers 840 to interface to display screen 920 for imaging, to keyboard or keypad 930, to computer mouse or touchpad 934, and/or to display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java®, C+) including low-level, high-level, object-oriented or non object-oriented languages. Alternatively, the functions of the programs can be implemented in whole or in part by computer circuits and other hardware (not shown).

Based on the foregoing, a computer system, method and program product have been disclosed for real-time determination of audience attentiveness to a speaker. However, numerous modifications and substitutions can be made without deviating from the scope of the present invention. Therefore, the present invention has been disclosed by way of example and not limitation.

What is claimed is:

1. A method for real-time determination of attentiveness of an audience in a room to a speaker making a presentation, the method comprising:
 a computer determining amounts of wireless activity of a computing device within the room of the audience over time during the presentation; and
 based in part on the amounts of wireless activity of the computing device, the computer determining and initiating display of measures of attentiveness of the audience over the time during the presentation, to display changes in the measures of attentiveness of the audience to the speaker during the presentation.

2. The method of claim 1, wherein lesser wireless activity corresponds to greater attentiveness of the audience.

3. The method of claim 1, further comprising the step of:
 monitoring amounts of movement of members of the audience over the time during the presentation; and
 wherein the measures of attentiveness of the audience is also based in part on the amounts of movement of the members of the audience.

4. The method of claim 1, further comprising the step of:
 monitoring levels of audible noise of members of the audience over the time during the presentation; and
 wherein the measures of attentiveness of the audience is also based in part on the amounts of audible noise of the members of the audience.

5. The method of claim 4, wherein the audible noise of members of the audience does not include applause from members of the audience.

6. The method of claim 1, further comprising the step of:
 recording the presentation correlated with the determined measures of attentiveness of the audience, wherein the determined measures of attentiveness of the audience correlate to the corresponding time in the presentation.

7. The method of claim 1, wherein the computer initiating display of measures of attentiveness of the audience over time during the presentation includes an indication of whether the speaker has lost the audience.

8. A computer system for real-time determination of attentiveness of an audience in a room to a speaker making a presentation, the computer system comprising:
- one or more computer processors;
- one or more computer-readable storage devices;
- program instructions stored on the computer-readable storage media for execution by at least one of the one or more processors, the program instructions comprising:
- program instructions to determine amounts of wireless activity of a computing device within the room of the audience over time during the presentation; and
- based in part on the amounts of wireless activity of the computing device, program instructions to determine and initiate display of measures of attentiveness of the audience over the time during the presentation, to display changes in the measures of attentiveness of the audience to the speaker during the presentation.

9. The computer system of claim 8, wherein lesser wireless activity corresponds to greater attentiveness of the audience.

10. The computer system of claim 8, further comprising program instructions to:
- monitor amounts of movement of members of the audience over the time during the presentation; and wherein the measures of attentiveness of the audience is also based in part on amounts of movement of the members of the audience.

11. The computer system of claim 8, further comprising program instructions to:
- monitor levels of audible noise of members of the audience over the time during the presentation; and wherein the measures of attentiveness of the audience is also based in part on the amounts of audible noise of the members of the audience.

12. The computer system of claim 11, wherein the audible noise of members of the audience does not include applause from members of the audience.

13. The computer system of claim 8, further comprising program instructions to:
- record the presentation correlated with the determined measures of attentiveness of the audience, wherein the determined measures of attentiveness of the audience correlate to the corresponding time in the presentation.

14. The computer system of claim 8, wherein the program instructions to initiate display of measures of attentiveness of the audience over time includes an indication of whether the speaker has lost the audience.

* * * * *